Jan. 17, 1928.　　　　　　　　　　　　　　　　1,656,268
R. G. DANIEL
SILENCING APPLIANCE FOR WRITING MACHINES
Filed April 16, 1925　　　　5 Sheets-Sheet 1

INVENTOR.
R. G. Daniel.
BY
ATTORNEY.

Jan. 17, 1928.

R. G. DANIEL 1,656,268

SILENCING APPLIANCE FOR WRITING MACHINES

Filed April 16, 1925   5 Sheets-Sheet 2

INVENTOR.
R. G. Daniel

BY
ATTORNEY.

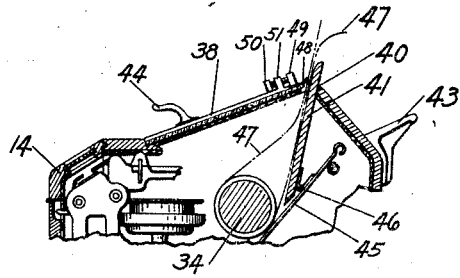
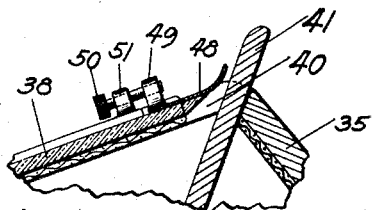
Fig. 5.  Fig. 6.
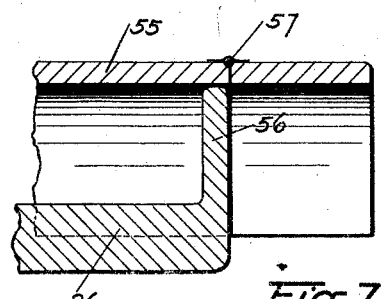
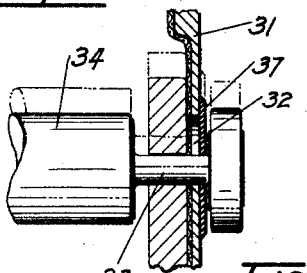
Fig. 7.  Fig. 8.
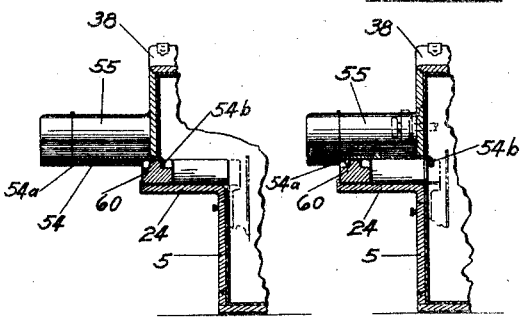
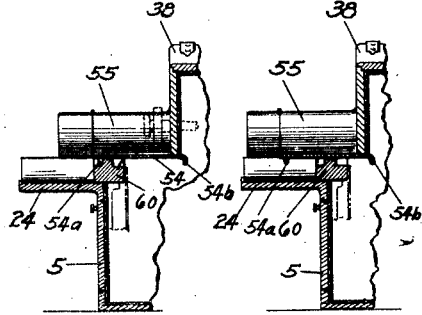
Fig. 9.  Fig. 10.  Fig. 11.  Fig. 12.
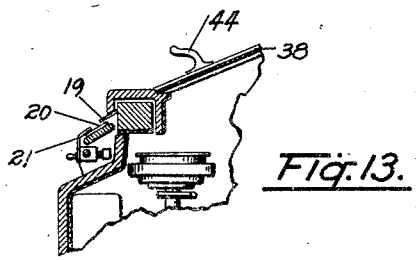
Fig. 13.
INVENTOR.
R. G. Daniel
BY
ATTORNEY.

Jan. 17, 1928.   R. G. DANIEL   1,656,268
SILENCING APPLIANCE FOR WRITING MACHINES
Filed April 16, 1925   5 Sheets-Sheet 4
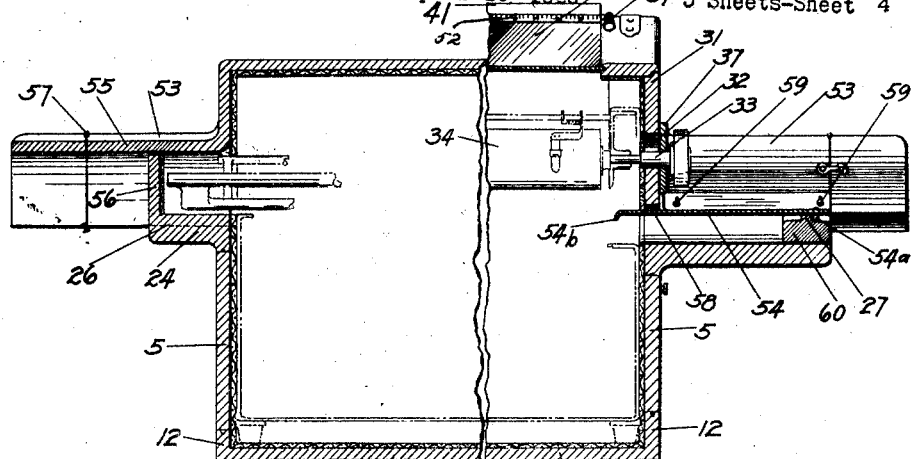
Fig. 14.
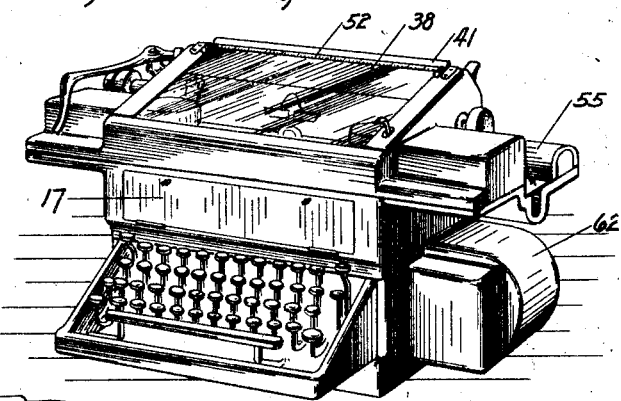
Fig. 15.
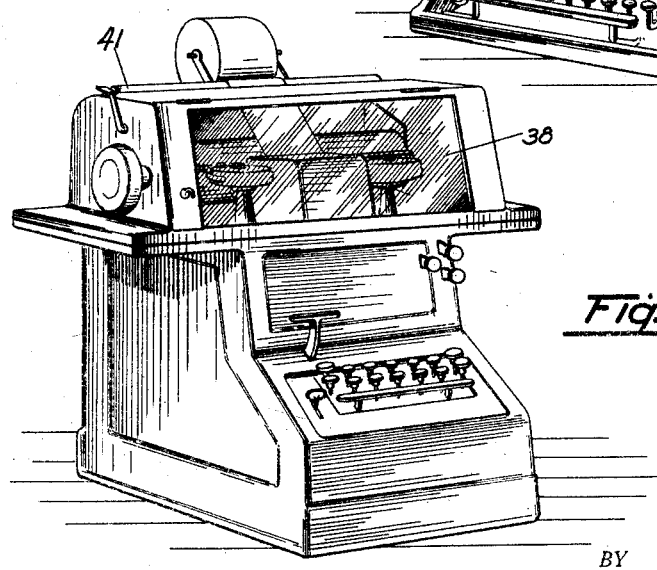
Fig. 16.
INVENTOR.
R. G. Daniel
BY
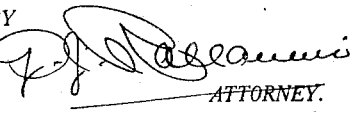
ATTORNEY.

Jan. 17, 1928.  1,656,268
R. G. DANIEL
SILENCING APPLIANCE FOR WRITING MACHINES
Filed April 16, 1925   5 Sheets-Sheet 5
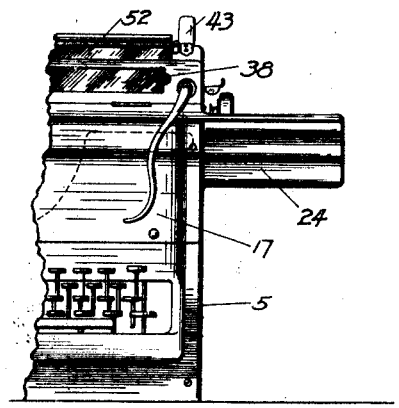
*Fig. 17.*
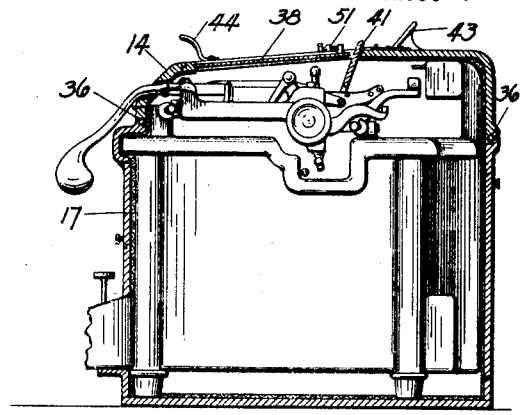
*Fig. 18.*
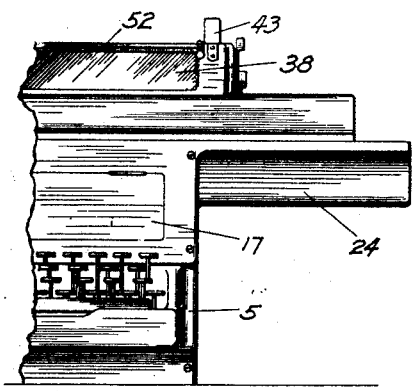
*Fig. 19.*
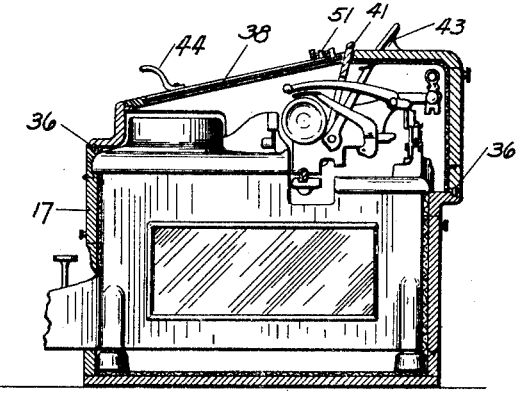
*Fig. 20.*
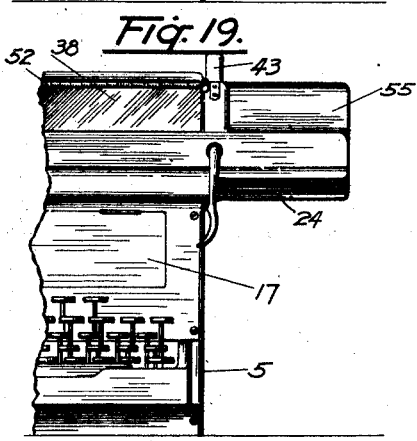
*Fig. 21.*
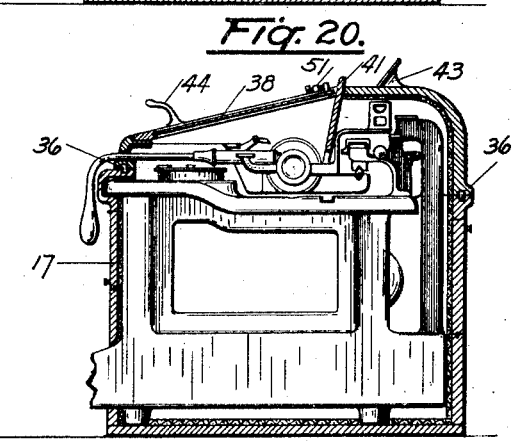
*Fig. 22.*
INVENTOR.
R. G. Daniel.
BY 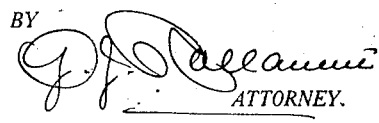
ATTORNEY.

Patented Jan. 17, 1928.

1,656,268

UNITED STATES PATENT OFFICE.

ROYAL G. DANIEL, OF DENVER, COLORADO, ASSIGNOR TO THE UNDERWOOD TYPEWRITER COMPANY, OF NEW YORK, N. Y., A CORPORATION OF DELAWARE.

SILENCING APPLIANCE FOR WRITING MACHINES.

Application filed April 16, 1925. Serial No. 23,548.

My invention relates to silencing appliances for typewriters and more particularly to certain new and useful improvements in the construction disclosed in my application for patent Serial No. 742,186, filed October 7, 1924.

The principal object of the present invention resides in certain improvements and modifications in the form, construction and arrangement of the elements which co-operatively provide a sound-deadening enclosure for the operating parts of a typewriting machine, which greatly simplify the appliance, reduce the length and height thereof to correspond with the accommodations of standard writing desks, and enhance the insulating qualities of the device with fewer and less intricate parts.

A further object of the invention resides in providing an appliance of the above described character which by the provision of movable doors and lids affords ready access to the operating mechanism of the machine, another object is to provide in association with the element which moves with the carriage of the machine, a glass lid which fully exposes the parts of the carriage and permits of changing the ribbon-spools without the removal of other parts.

A further object resides in arranging the glass lid of the carriage-enclosing element to provide a guide and slot for the passage of the work-sheet to and from the platen, and still another object is to provide a paper rest and an adjustable gage which in co-operation with the lid, guide the work sheets and determine and maintain its position relative to the platen.

Figure 1:
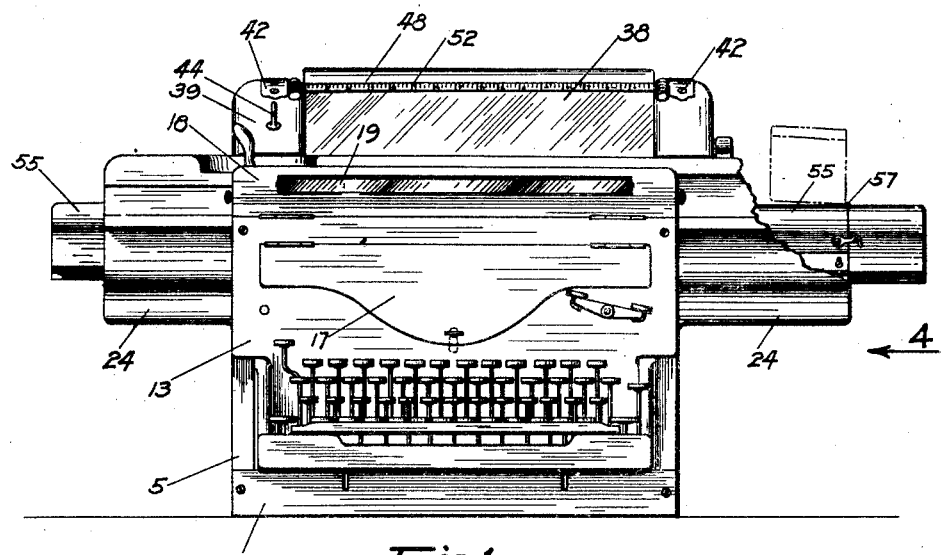
Figure 2:
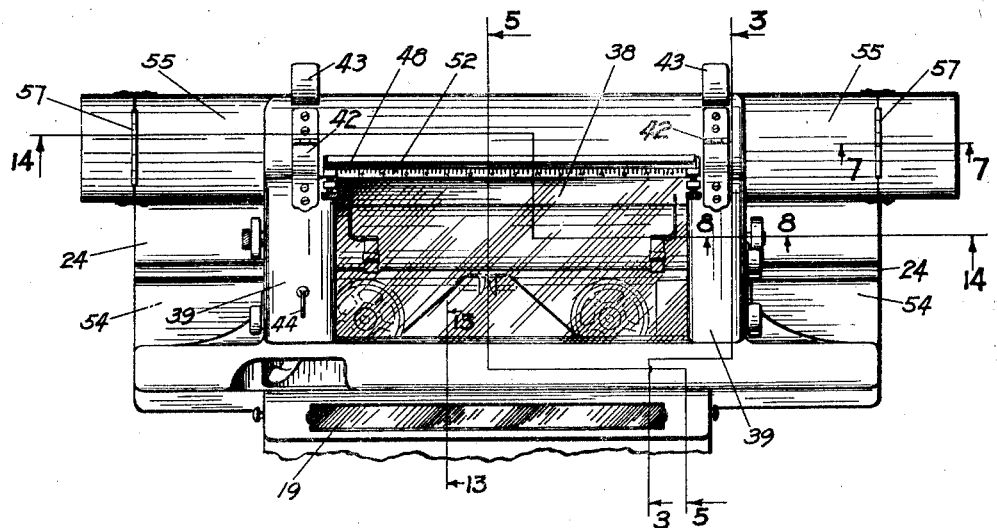
Figure 3:
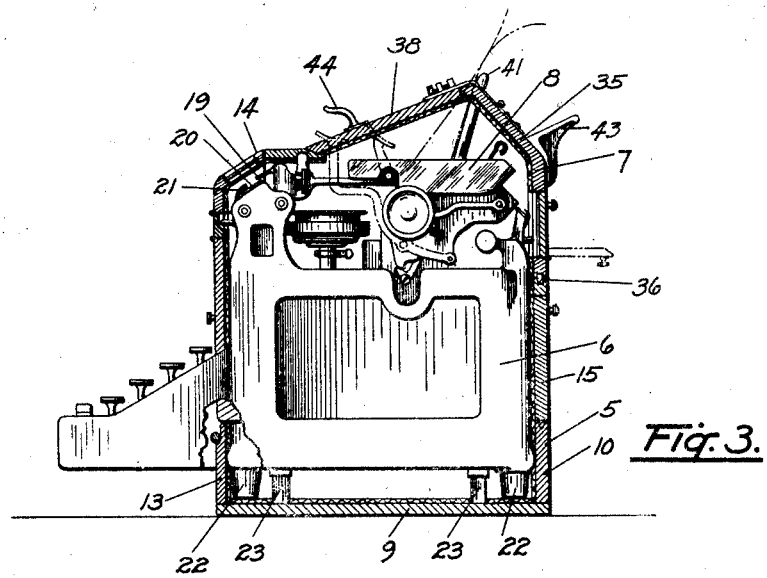
Figure 4:
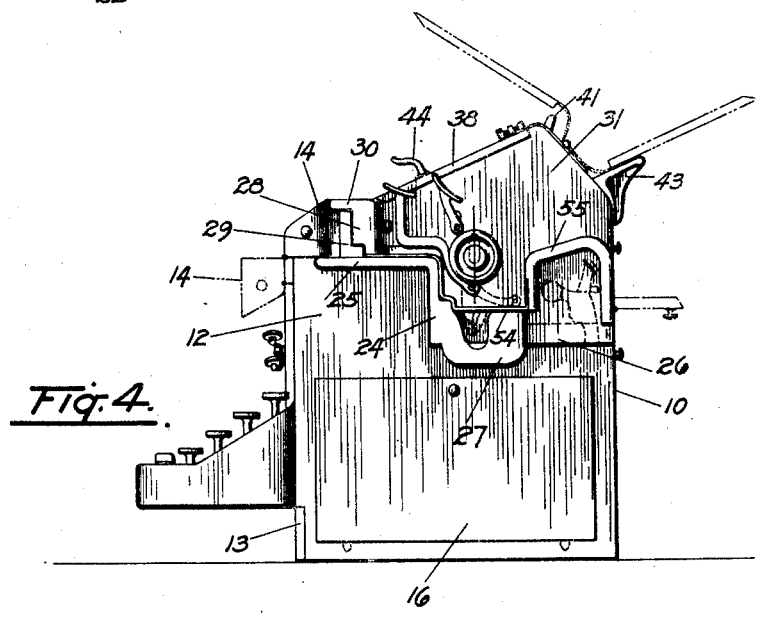

With the above and further objects in view as will fully appear in the course of the following description, my invention consists in the construction, arrangement and combinations of parts illustrated in the accompanying drawings in which like characters of reference designate corresponding parts throughout the several views and in which Figure 1 represents a side elevation of the silencing appliance in its relation to a typewriting machine of conventional construction;

Figure 2, a fragmentary plan view of the same;

Figure 3, a vertical transverse section through the appliance taken on the line 3—3, Figure 2;

Figure 4, a side elevation of the construction shown in Figure 1, looking in the direction of the arrow 4;

Figure 5, a fragmentary section along the line 5—5, Figure 2;

Figure 6, an enlarged sectional view of the parts defining the slot through which the work-sheets pass to and from the platen of the writing machine;

Figure 7, an enlarged fragmentary section on the line 7—7, Figure 2;

Figure 8, an enlarged fragmentary section taken along the line 8—8, Figure 2;

Figures 9, 10, 11 and 12, fragmentary sections, showing different positions of the sound-deadening shuttle which closes the trough-like parts of the stationary element of the appliance, admitting the under portion of the carriage of the writing machine in the longitudinally reciprocating movement thereof;

Figure 13, a fragmentary sectional view on the line 13—13, Figure 2, showing a modified construction of the stationary sound-insulating element of the appliance at the front of the machine;

Figure 14, a vertical section through the appliance, taken in two planes indicated by the line 14—14 in Figure 2;

Figure 15, a perspective view showing the application of the invention to an electrically operating writing machine of the "Woodstock" type;

Figure 16, a perspective view illustrating the invention as applied to an adding machine of conventional construction;

Figures 17 and 18, respectively, a fragmentary front view and a vertical transverse section of the silencing appliance as adapted for a writing machine of the "Remington" type;

Figures 19 and 20, similar views showing the device as applied to a "Royal" typewriter; and Figures 21 and 22, similar views of the appliance in connection with a machine of the "L. C. Smith & Bros." type.

Referring further to the drawings, the improved silencing appliance comprises a stationary enclosing element 5 for the frame 6 of the typewriting machine, and a movable enclosing element 7 mounted on the letter-spacing carriage 8 of the same.

The two elements co-operatively enclose the operating mechanism of the machine so as to provide a sound-insulating casing and the relative arrangement of the two elements to maintain a sound-proof contact during the movement of the one with relation to the other is an essential and salient feature of the invention.

The fixed element of the attachment comprises a box-shaped enclosure fitting snugly upon the frame of the writing machine. The box consists of a bottom-member 9, a back member 10, side-members 12 and a front-member 13 which as best shown in Figure 3, has an opening for the protrusion of the front portion of the machine including the system of keys which operate the type-bars to strike a work sheet upon the platen on the movable carriage.

The upper portion of the front-member 13 of the box above the keyboard closes the front of the "well" of the machine by which the basket of pivoted type-bars are accessibly exposed, and it is extended to provide a rearwardly projecting flange 14 which partially covers the top of the well.

Projecting laterally from the side-members 12 of the element 5 at the upper edges thereof, are horizontal wings 24 which together with the upper edge of the rear-member 10 of the same provide the contact surfaces engaged by the moving element of the appliance which as stated hereinbefore, is mounted on the carriage of the machine.

The box-like enclosure 5 is provided with a number of doors to afford access to the operating mechanism of the typewriter and these doors may be hinged, slidably mounted, or removably supported as may be found to be most practical and convenient in the use of the particular machine to which the invention is applied.

In the construction shown in Figures 1 to 4 of the drawings, which is particularly adapted for use in connection with a typewriter of the "Underwood" type, the rear-member of the box has a removable door 15, the side members of the same are provided with doors 16 hinged at their lower edges and the front member has above its opening through which the forward portion of the typewriter protrudes, a lower door 17 hinged at its upper edge to afford access to the type bars in the well of the machine, and an upper door 18 hinged at its lower edge to permit of adjustment of the marginal stops by the operator of the machine.

The last mentioned door is preferably provided with a transparent window 19 to expose the front scale 20 and the index 21 on the carriage, which co-operates therewith, to the view of the operator.

The typewriting machine fitting snugly in the box-like frame-enclosing element of the silencing appliance rests upon the bottom thereof either by means of its rubber feet 22 or through the medium of metal-headed resilient strips 23 shown in Figure 3, which are fastened lengthwise or transversely of the box as may be found to be most practical and convenient.

The enclosure 5 may be made of metal or fiber and its walls and doors are lined with felt, cork or other sound-insulating material.

In order to not detract from the appearance of the machine by the application of the silencing attachment, the latter may be exteriorly shaped to strictly conform with the lines and contour of the frame of the typewriter.

The lateral wings at the upper edges of the side-members 12 of the enclosing element 5, each comprise a front-ledge 25, a rear ledge 26 and an interposed trough 27 which admits the under portions of the carriage in the longitudinal reciprocating movement thereof.

Vertical ridges 28 on the front ledges 25 are continuous with the rearwardly projecting flange 14 at the front of the box 5 to provide a contact surface for the element 7 mounted on the carriage, at the forward side thereof.

The element 7 considered as a whole, constitutes a hood which fits slidably upon the stationary element and encloses the movable carriage of the typewriting machine. The contact between the two elements is made substantially sound-proof by the application of resilient packing strips or other sound-deadening contrivances and the functions of the wings at the sides of the stationary element, is to maintain the sound-insulating contact between the two elements during movement of the carriage in both directions.

In detail, the moving element of the invention comprises a low front wall 29 which engages the ridges 28 on the front ledges of the wings and which has a forwardly projecting flange 30 in engagement with the corresponding edge of the rearwardly extending flange 14 on the front wall of the supporting element 5.

Parallel side walls 31 on the carriage enclosure are slotted as at 32 to admit the shaft 33 of the platen 34 on the carriage at opposite ends thereof and an angular rear wall 35 engages with the upper edge of the rear wall of the stationary element and with the rear ledges of the wings of the same, which are in a horizontal plane with said edge.

Anti-friction bearings of the ball or roller type, indicated at 36 in the drawings, may be applied between the contacting parts of the elements to reduce the frictional resistance to the movement of the carriage of the writing machine.

The slots 32 in the side walls of the cover-element, provided to permit of the upward movement of the carriage in shifting from one set of types to another in the operation of the typewriter, are closed by circular felt washers placed around the shaft of the platen as shown at 37 in Figure 14 of the drawings.

The opening defined by the upper edges of the four wall members of the cover-element 7 is normally closed by a slanting lid 38 which may be composed of a single plate of heavy glass set in grooves of parallel side strips 39.

The lower edge of the glass plate rests normally upon a ledge on the inside of the front wall 29 of the hood and the side strips of the lid may be mortised to admit the edges of the side walls 31 of the same.

The rear-edge of the glass plate is spaced from the corresponding edge of the rear wall member to provide a slot 40 for the passage of the work-sheets to and from the platen of the writing machine, and this slot is partially occupied by a paper rest 41 as will hereinafter be more fully described.

The lid 38 is movably mounted by hinges 42 applied between its side strips 39 and the rear wall of the relatvely stationary part of the hood, and rests 43 are provided to support the lid in its open position.

A handle 44 on one of the side strips is readily accessible to the operator sitting in front of the machine to open the lid and thereby afford access to the platen and other parts of the carriage.

The hood 7 is like the stationary element of the appliance, made of metal, fiber or other suitable material lined with a sound-insulating substance such as felt or cork, and strips of similar substance may be applied to the parts of the hood engaged by the lid in its closed position to prevent the leakage of sound.

As mentioned hereinbefore, a paper rest 41 extending upwardly from behind the platen of the writing machine, protrudes through the paper-slot between the rear edge of the lid and the therewith parallel edge of the rear wall of the relatively stationary part of the hood and this paper rest is in machines in which the carriage or platen moves upwardly to shift from one type to another, hinged to permit of its following the movement of the carriage, in the slot.

In an Underwood machine the paper rest is hinged upon the ordinary paper guide 45 which is part of the standard equipment of the machine, as indicated at 46 in Figure 5, but in other machines, such as shown in Figures 18, 20 and 22, the ordinary paper guide is removed and the paper rest of the appliance is either fixed or hinged to another convenient part of the carriage.

It will be apparent from the broken line illustration of Figure 5, that the work sheet 47 is readily inserted through the slot 40 to engage between the platen and the paper clamps, and that the slanting cover functions as a guide to direct the written portion of the sheet to and through the same slot.

It is to be understood, however, that if so desired, the cover may be provided with an additional slot for the exit from the hood of a sheet entered through the slot rearward of the lid.

In order to vary the width of the slot 40 according to the thickness of the sheet or sheets inserted in the machine, the lid is provided with an adjustable gage 48 in parallel relation to the protruding portion of the paper rest 41.

The gage, best shown in Figure 6, consists of a strip provided with apertured ears 49 for the connection of adjusting screws 50 in lugs 51 fastened upon the side strips of the lid. The strip 48 turns upwardly at its edge above the paper-slot and it may be provided with a graduated scale 52 to indicate the position of the paper in correspondence with the front scale exposed through the window of the flange-portion of the front wall of the stationary support.

It will be understood that the gage strip is capable of adjusting the slot to the minimum width required for the free passage of the paper, and thus aids in preventing the leakage of sound through the slot.

In order that the typewriting machine may remain constantly closed at its ends during the movements of the carriage in opposite directions, the hood is provided with extensions in co-operative relation to the wings of the stationary element 5.

The extensions indicated in their entirety by the reference numeral 53 each comprise an angular plate 54 slidably fitted upon the forward ledge 25 and across the trough 27 of the respective wing 24, and a hollow sheath or cover member 55 for the rear ledge 26, which extends in alinement with the rear wall member 35 of the hood.

The ledges 26 which support the tabular scale and guide rods at the rear of the carriage of the writing machine have at their ends upright heads 56 which fit inside the hollow sheath-members to prevent the passage of sound through the open ends thereof.

The heads may be provided with strips of insulating material for their sound-proof contact with the interior surface of the sheaths.

In order that the writing machine enclosed in the appliance may be lowered into the well of a typewriting desk, the end portions of the sheath members of the extensions of the hood, projecting beyond the other members of the same, are hinged as at 57 so that they may be folded upon the body portions of the members when the machine is not in use.

It will be apparent, without further illustration, that other methods may be employed for shortening the sheath members as for example by telescoping the outer portions upon the body portions thereof.

The edges of the troughs of the wings of the stationary support may be provided with packing strips 58 for the sound-insulating engagement of the cover-plates 54 on the hood of the carriage and in order to insure the sound-proof contact of the strips with the plates, the latter may be made vertically adjustable by slots and screws as shown at 59 in Figure 14.

The ends of the troughs are permanently closed during the movements of the carriage, by sliding shuttles 60 adapted to move back and forth with the carriage as illustrated in Figures 9 to 12 inclusive of the drawings. The object of the shuttles is to provide a permanent closure for the troughs of the wings 24 without the necessity of extending the members to a length which would prevent of the machine being lowered into the well of a typewriting desk.

The shuttles are each composed of a block fitting snugly in the troughs and beneath the plates 54 on the hood 7. They are provided with notches at their upper edges, and the plates have lips 54$^a$ adapted to enter the notches and thereby adjust the positions of the shuttles from one end of the troughs to the other.

Thus in Figure 9, the shuttle is shown at the extreme end of the trough while the carriage of the writing machine is at the corresponding end of its reciprocating movement.

During the return movement of the carriage, the shuttle remains at the end of the trough as indicated in Figure 10, until the lip at the outer end of the plate engages in the outer notch thereof when the shuttle is moved to the opposite end of the trough as shown in Figure 11 while the carriage completes its movement.

When the movement of the carriage is subsequently reversed the shuttle again remains in its adjusted position during the first part of the reversed movement as indicated in Figure 12.

Both the stationary element and the sliding carriage-encasing element of the appliance may be provided with openings wherever the protrusion of a lever is required for the operation of the machine and these openings may be closed by bushings or strips of flexible sound-insulating material.

Inasmuch as the position of such openings and the form of their packings must necessarily be varied in accordance with the construction of the different writing machines to which the invention is applicable, the packings have not been shown in detail in the drawings.

In Figure 13 of the drawings has been shown a modification of the frame-enclosing element at the front of the machine which dispenses with the window 19 of the first described construction by direct exposure of the spacing scale 20.

The upper portion of the front wall of the frame-enclosure is to this end extended underneath the scale to engage with the undersurface of the rackbar 61, and the flange on the carriage is extended at right angles to engage the upper edge of the scale.

Oil holes preferably closed by hinged lids or spring valves may be formed in the casings wherever it is required to lubricate the movably contacting parts thereof.

To adapt the appliance for use in connection with writing machines other than the Underwood, requires only variations in size and form and relative arrangement of the parts without sacrificing or changing the essential features of the invention as herein set forth and defined in the hereunto appended claims.

In Figure 15 of the drawings has been shown the invention as applied to an electrically operated machine of the Woodstock type. The most prominent difference in the construction of the appliance from that hereinbefore described resides in the provision of an extension 62 of the stationary element to enclose the electric motor of the machine.

The extensions of the cover element are moreover changed in shape to accommodate the carriage, and the moving shuttles of the first described construction have been eliminated.

Figure 16 illustrates the application of the invention to an adding machine. It is apparent that the silencing appliance must be changed in form to adapt it to a machine of this kind, although the salient features residing particularly in the arrangement of a stationary enclosing element and a relatively movable hood-element, and in the specific construction of the latter, are present as before.

The adaptation of the invention to machines of the Remington, Royal and L. C. Smith & Bros. types has been clearly illustrated in Figures 17 to 22 and needs no further explanation.

It will be evident that the silencing appliance as shown and described is well adapted to enclose the noise-producing parts of a typewriting or adding machine without interfering with the ordinary operation thereof.

The keyboard, the operating levers and the various adjustments are as accessible as before, the carriage is constantly enclosed during its movements without excessive extension of the protective and sound-insulating casing, the scales and the work sheets are plainly visible to the operator, and the paper may be inserted and removed as readily as before the invention was applied.

Having thus described my improved silencing appliance, it will be understood that variations other than those mentioned hereinbefore, in both the construction and the arrangement of its parts may be resorted to within the scope of the invention and that such of the improvements as may be separately employed with beneficial results, can be used independent of other parts of the structure or in combination with silencing devices of different character.

What I claim and desire to secure by Letters Patent is:

1. A silencing appliance for writing machines comprising a sound-insulating casing for the frame of the machine, having an opening for the protrusion of the key-board, and provided with a window exposing a spacing scale at the front of the machine, and a sound-insulating hood for the carriage of the machine movable with the carriage and having a transparent lid above the window.

2. A silencing appliance for writing machines comprising a sound-insulating element for the frame of the machine, having wings extending in the direction of the movement of the carriage of the same, and an encasing element for the carriage of the machine movable with the carriage and having extensions co-operating with the wings for the insulation of sound at the sides of the machine.

3. A silencing appliance for writing machines comprising a sound-insulating element for the frame of the machine, having wings including channels to admit portions of the carriage in the movement thereof, an encasing element for the carriage of the machine, movable with relation to the first element and having extensions covering said channels, and means for closing the channels at the ends thereof.

4. A silencing appliance for writing machines comprising a sound-insulating element for the frame of the machine, having wings including channels to admit portions of the carriage in the movement thereof, an encasing element for the carriage of the machine, movable with relation to the first element and having extensions covering said channels, and shiftable shuttles closing the channels at the ends thereof, in co-operative relation to the extensions.

5. A silencing appliance for writing machines comprising a sound-insulating element for the frame of the machine, having wings each including a ledge beneath a portion of the frame rearward of the carriage, and a head at the end of the ledge, and a carriage-encasing element movable with the carriage and having extensions including covers for said portions of the machine, in sliding engagement with the ledges.

6. A silencing appliance for writing machines comprising a sound-insulating element for the frame of the machine, having wings each including front and rear ledges and a trough between the ledges, and a carriage encasing element movable with the carriage and having extensons in sliding contact with the wings, including members covering the troughs.

7. A silencing appliance for writing machines comprising a sound-insulating element for the frame of the machine, having wings each including front and rear ledges and a trough between the ledges, and a carriage-encasing element movable with the carriage and having extensions in sliding contact with the wings, including vertically adjustable members engaging the edges of the troughs.

8. A silencing appliance for writing machines comprising a sound-insulating element for the frame of the machine, having wings and an upstanding ridge at the front of the machine, and an encasing element for the carriage of the machine movable with the carriage and having extensions in sliding engagement with the wings, and a member in sliding contact with the ridge.

9. A silencing appliance for writing machines comprising a sound-insulating element for the frame of the machine, having wings and an upstanding ridge at the front of the machine, and an encasing element for the carriage of the machine movable with the carriage and having extensions in sliding engagement with the wings, and a flanged member in sliding contact with the ridge.

10. A silencing appliance for writing machines comprising a sound-insulating element for the frame of the machine, and an encasing element for the carriage of the machine, movable with the carriage and including a hinged lid slanting upwardly from the front of the machine over and beyond the platen on the carriage and spaced at its rear edge from the first element to provide a slot for the passage of a work sheet.

11. A silencing appliance for writing machines comprising a sound-insulating element for the frame of the machine, and an encasing element for the carriage of the machine, movable with the carriage and including a hinged lid slanting upwardly from the front of the machine over and beyond the platen on the carriage, the encasing element having a slot rearward of the slanting surface of the lid for the passage of a work sheet.

12. A silencing appliance for writing machines comprising a sound-insulating element for the frame of the machine, and an encasing element for the carriage of the machine, movable with the carriage and including a hinged lid slanting upwardly from the front of the machine over and beyond the platen on the carriage, and composed of a glass plate between parallel side-strips, the encasing element having a slot rearward of the lid for the passage of a work-sheet.

13. A silencing appliance for writing machines comprising a sound-insulating element for the frame of the machine, an encasing element for the carriage of the machine, movable with the carriage and having a surface slanting upwardly from the front of the machine over and beyond the platen on the carriage and a slot rearward of said surface, and a paper-rest projecting through the slot.

14. A silencing appliance for writing machines comprising a sound-insulating element for the frame of the machine, an encasing element for the carriage of the machine, movable with the carriage and having a surface slanting upwardly from the front of the machine over and beyond the platen on the carriage and a slot rearward of said surface, and a self-adjusting paper rest projecting through the slot.

15. A silencing appliance for writing machines comprising a sound-insulating element for the frame of the machine, an encasing element for the carriage of the machine, movable with the carriage and having a surface slanting upwardly from the front of the machine over and beyond the platen on the carriage and a slot rearward of said surface, a paper rest projecting through the slot, and an adjustable gage spaced from the paper rest.

16. A silencing appliance for writing machines comprising a sound-insulating element for the frame of the machine, an encasing element for the carriage of the machine, movable with the carriage and having a surface slanting upwardly from the front of the machine over and beyond the platen on the carriage and a slot rearward of said surface, a paper rest projecting through the slot, and an adjustable scale-bearing gage spaced from the paper rest.

17. A silencing appliance for writing machines comprising a sound-insulating element for the frame of the machine, an encasing element for the carriage of the machine, movable with the carriage and having a surface slanting upwardly from the front of the machine over and beyond the platen on the carriage and a slot rearward of said surface, and a graduated scale extending along the slot.

In testimony whereof I have affixed my signature.

ROYAL G. DANIEL.